United States Patent [19]

Timmons

[11] Patent Number: 4,652,023
[45] Date of Patent: Mar. 24, 1987

[54] REPAIR COUPLER

[76] Inventor: Fred A. Timmons, 418 Juniper Ave., Chico, Calif. 95926

[21] Appl. No.: 738,759

[22] Filed: May 29, 1985

Related U.S. Application Data

[63] Continuation-in-part of Ser. No. 579,599, Feb. 13, 1984, abandoned.

[51] Int. Cl.$^4$ ............................................. F16L 21/06
[52] U.S. Cl. ...................................... 285/93; 285/373; 138/99
[58] Field of Search .......................... 285/373, 419, 93; 138/99; 411/533, 85, 103, 107, 339

[56] References Cited

U.S. PATENT DOCUMENTS

| | | | |
|---|---|---|---|
| 320,771 | 6/1885 | Ford | 285/373 |
| 725,610 | 4/1903 | Wossoff | 285/373 |
| 1,831,641 | 11/1931 | Skinner | 285/373 X |
| 1,913,030 | 6/1933 | Hux | 285/373 X |
| 1,970,078 | 8/1934 | Dillon | 285/373 |
| 2,094,258 | 9/1937 | Thompson | 285/373 X |
| 2,385,851 | 10/1945 | Swanstrom | 411/103 |
| 2,439,516 | 4/1948 | Holcomb | 411/533 X |
| 2,922,455 | 1/1960 | Braendel | 411/103 |
| 2,958,546 | 11/1960 | Lee | 285/373 X |
| 3,153,550 | 10/1964 | Hollett | 285/373 X |
| 3,399,409 | 9/1968 | Breed | 411/85 X |
| 3,954,288 | 5/1976 | Smith | 285/373 |
| 4,018,979 | 4/1977 | Young | 285/373 X |
| 4,036,513 | 7/1977 | Loftus et al. | 285/373 X |
| 4,361,997 | 12/1982 | De Caro | 411/533 X |
| 4,417,755 | 11/1983 | Gittleman | 285/373 |
| 4,522,434 | 6/1985 | Webb | 285/373 X |

FOREIGN PATENT DOCUMENTS

| | | | |
|---|---|---|---|
| 227512 | 1/1959 | Australia | 285/373 |
| 494654 | 4/1950 | Belgium | 138/99 |
| 547980 | 6/1956 | Belgium . | |
| 740433 | 11/1955 | United Kingdom | 285/373 |
| 763665 | 12/1956 | United Kingdom | 285/373 |
| 2111153 | 6/1983 | United Kingdom | 285/373 |

Primary Examiner—Thomas F. Callaghan
Attorney, Agent, or Firm—Bernard, Rothwell & Brown

[57] ABSTRACT

A repair coupler including two identical mating coupler members having a complementary relationship is disclosed. Each of the two complementary coupler members is formed to include a portion of semicircular cross-section and outwardly extending longitudinal flanges at each side of the semicircular portion. Each semicircular portion includes a plurality of spaced grooves for receiving semicircular ribs of a liner. Each coupler member has a longitudinal recess adjacent each side of the semicircular portion for receiving a longitudinal section of the liner. A sealing liner includes a plurality of spaced ribs received in the grooves and longitudinally extending connecting sections received in the longitudinal recesses. The ribs engage a pipe and the longitudinal sections engage each other to form an effective seal. The coupler members are held together by simple fasteners, such as machine screws received in holes in the flanges and hex-headed nuts received in recesses in the flanges. At each end each coupler member has a ridge formed adjacent one of the aforementioned outer grooves to protect the coupler against liner blowouts longitudinally of the coupler and may also have ridges formed adjacent the inner grooves. The ridges are formed with knife edges which engage the pipe and are slightly compressed in the full assembled position of the coupler to provide support for the pipe. Further knife edges for engaging the pipe are provided in a diagonal arrangement in the central portion of the coupler. The holes in the coupler flanges contain restricted portions to retain the machine screws and the recesses in the flanges are shaped to retain the nuts.

12 Claims, 21 Drawing Figures

REPAIR COUPLER

This application is a continuation-in-part of application Ser. No. 579,599, filed Feb. 13, 1984 and now abandoned.

BACKGROUND OF THE INVENTION

This invention relates to couplers which are particularly suitable for repairing leaks in existing pipes. The repair coupler of this invention is also suitable for providing a leakproof coupling between two aligned sections of pipe and for providing a tee connection for connecting a new pipe to an existing pipe.

Some prior art couplers are difficult to assemble and particularly are difficult to use with existing pipes where access presents a problem. Further, some prior art couplers require the use of cements to provide an effective seal. Other couplers necessitate cutting the existing pipe in two in order to permit assembly of the coupler thereto. Some existing couplers do not make an effective seal with pipes which are out of round, and this is a condition which may frequently occur in the case of plastic pipes which have been exposed to the elements.

With the repair coupler of this invention these disadvantages of prior art couplers have been eliminated. The repair coupler of this invention is simple in construction and easy of assembly. It requires no cementing and therefore eliminates the necessity for any temporary clamping while the cement sets. Further, it is adaptable for pipes which may be as much as fifteen thousandths out of round and forms an effective seal despite this eccentricity of pipe shape. In the case of small cracks and pin hole leaks, the repair can be effected with the coupler of this invention without even turning the water off. In the case of larger leaks it is necessary to turn the water off to eliminate the pressure, but even in those situations the repair coupler of this invention has the advantage of materially reducing the time required for repair. The only preparation necessary before installing the repair coupler of this invention, even with the pipes which have been in place over a prolonged period of time, is to use a wire brush or similar tool to remove rust or soil in order to obtain a clean surface. The repair coupler requires no special tools, a simple screw driver being sufficient to effect the assembly of the coupler into sealing leakproof engagement with the pipe.

SUMMARY OF THE INVENTION

In carrying out the invention in one form thereof, the repair coupler includes two identical mating coupler members having a complementary relationship. Each of the two complementary coupler members is formed to include a portion of semicircular cross-section and further includes outwardly extending longitudinal flanges at each side of the semicircular portion. Each semicircular portion includes a pluralilty of spaced grooves for receiving a liner. Further each coupler member is formed with a longitudinal recess adjacent each side of the semicircular portion for receiving a longitudinal section of the liner. At each end the coupler member has a ridge which is formed adjacent one of the aforementioned grooves to provide a pipe support, to protect the liner from adverse effect of the elements and of ozone, and to protect the coupler against liner blowouts longitudinally of the coupler. Further ridges may be provided adjacent other grooves for further pipe support. One flange of each of the coupler members may include an aligning pin adapted to be received in a corresponding recess in the flange of the other coupler member. The sealing liner, which includes a plurality of spaced ribs and longitudinally extending connecting sections, is received in each of the coupler members. The ribs are received in the grooves and engage the pipe and the longitudinal sections engage each other to form an effective seal. The longitudinal sections of the liner fit in the aforementioned longitudinal recesses in the coupler member and prevent lateral pressure blowouts. The coupler members are held together by simple fasteners, such as conventional machine screws and hex-headed nuts.

In a modified form of the invention, particularly suitable where two sections of pipe are to be joined together, a plurality of ridges are formed on the inner semicircular surface of each coupler member adjacent corresponding grooves. These ridges are formed of knife-edge cross section so that the sharp portion of the knife-edge of the ridges engages the pipe when the coupler components are assembled and the liner is compressed. This provides firm engagement for the pipe sections so that leakage is prevented even if the pipe sections are moved or are vibrated by external forces. Further in this modification additional diagonally arranged ridges having a knife edge are provided in the central portion of the coupler between the innermost pair of grooves. These diagonal ridges further assist in supporting the pipe and in minimizing relative movement of the pipe sections and movement of the pipe sections relative to the coupler members. The pipe engaging portions of the liner are provided with spaced ridges insuring firm sealing engagement between the liner ribs and the pipe sections. In order to minimize longitudinal distortion of the liner and to keep the longitudinal sections thereof in a relatively straight line and in engagement with the adjacent portions of the coupler members the liner is formed to include depending flanges extending between adjacent ribs of the liner and positioned so as to be adjacent the longitudinal wall of the corresponding coupler member. In order to minimize risk of losing the machine screws and nuts, particularly when working in a confined space and sometimes under water, the coupler members are shaped to provide inwardly extending elements for engaging the machine screw and the nut to hold these components in position.

BRIEF DESCRIPTION OF THE DRAWINGS

For a better understanding of this invention reference may be made to the accompanying drawings in which.

DESCRIPTION OF THE PREFERRED EMBODIMENTS

Figure 1:
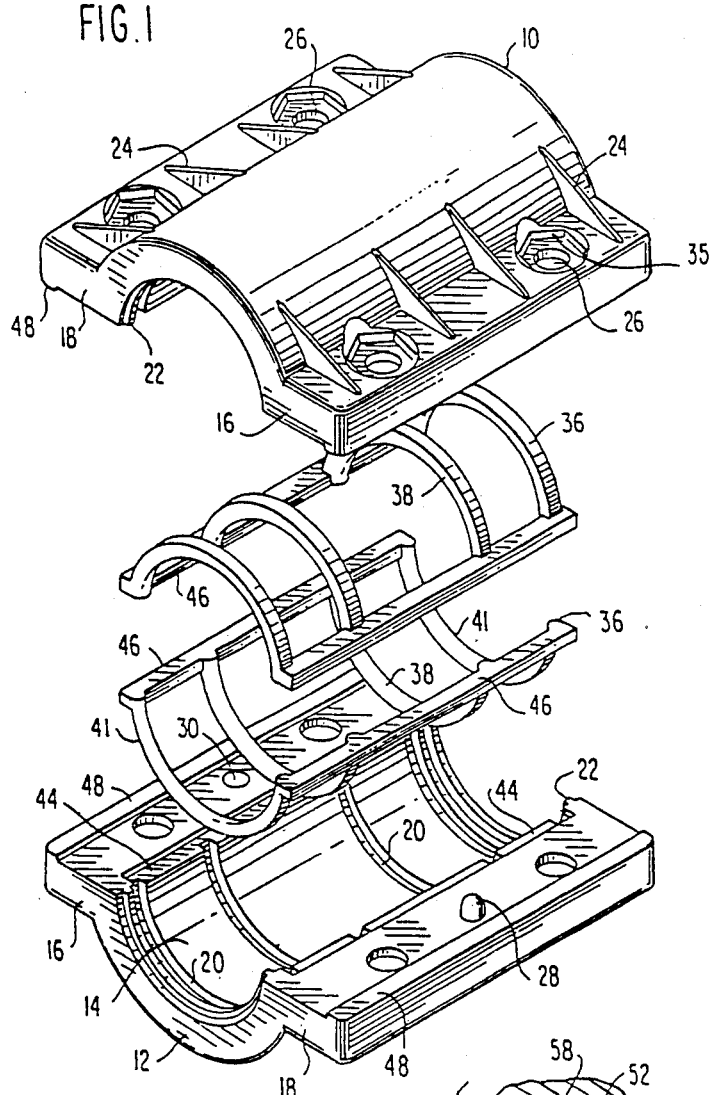
FIG. 1 is an exploded view showing the several components which are assembled to provide the repair coupler of this invention.

Referring particularly to FIG. 1, the repair coupler of this invention includes two complementary outer coupler members 10 and 12. These members are of identical construction and are adapted to be assembled in complementary mating relationship. Each of the coupler members 10, 12 includes a central portion 14 of semicircular cross-section and flanges 16, 18, extending laterally outwardly from the central semicircular portion thereof.

Each coupler member further includes a plurality of semicircular grooves or recesses 20 of square cross-section which are positioned in longitudinally spaced relationship along the length of the semicircular portion. The end grooves are positioned relatively closely adjacent to the ends of the coupler member. Each coupler member is formed with a ridge 22 near the end thereof and positioned relatively closely to the aforementioned end grooves. This ridge, as will be explained in more detail later, is provided to serve as a pipe support or holder, to prevent pressure blow-out of a liner rib which is received within the end groove and to protect the liner against adverse effects of the elements and ozone.

A plurality of gussets 24 are arranged externally of the coupler members between the semicircular portion and the flanges to strengthen the coupler members. A plurality of passages or holes 26 are provided in the flanges 16, 18 for receiving fastening members. In order to position the openings in the two coupling members in proper aligned relationship and also to align the openings 26 for receiving the fastening members, each coupler member may include a pin 28 and a recess 30. The pin is received in the recess of a mating member when the members are positioned in assembled relationship.

Figure 2:
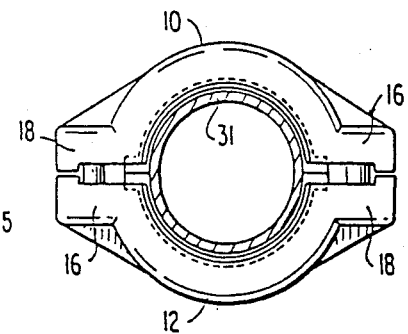
FIG. 2 is an elevation view of the repair coupler in its assembled relationship on a pipe to be repaired.
Figure 3:
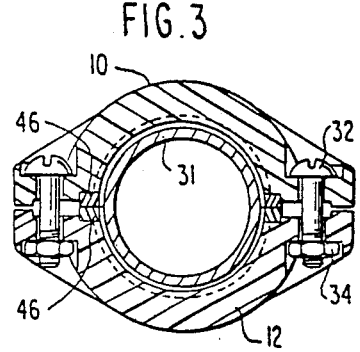
FIG. 3 is a transverse sectional view through the assembled coupler.

In order to hold the coupler members in assembled relationship and to maintain the repair coupler in sealing relationship with a pipe to be repaired, indicated at 31 in FIGS. 2 and 3, fastening members are provided to extend through the holes 26. The particular form of fastening member employed in one embodiment of this invention, as shown in FIG. 3, comprises a machine screw 32 and a hex-headed nut 34 for engaging the machine screw 32. While machine screws and hex-headed nuts are preferred for use as fasteners, because, as will be described later, this permits easy assembly of the coupler, requiring only a screw driver, it will be apparent that other fasteners, such as conventional nuts and bolts could be employed, if desired. In the particular form of invention illustrated in FIG. 1 the flanges are formed with recesses 35 of hexagonal shape. Each nut 34 is received in a corresponding one of these recesses and is prevented from turning as the machine screw 32 is tightened because of engagement of the nut with the hexagonal-shaped recess.

The coupler members may be made from any suitable material having the necessary strength and rigidity, for example, polyvinyl chloride. One commercially available material which is suitable for couplers employed with pipes carrying drinking water is that sold by B. F. Goodrich Company under the designation #87322. For couplers employed with pipes carrying hot water B. F. Goodrich's CPVC material is satisfactory.

In order to provide for effective sealing of a leak in a pipe, both longitudinally and laterally, a pair of liners or gaskets 36 are provided. One of the liners 36 is arranged to be received within the coupler member 10 and the other liner is arranged to be received within the mating coupling member 12. The liners 36 are identical in structure and each liner 36 comprises a plurality of longitudinally-spaced semicircular ribs 38. Each of the ribs 38 is disposed so as to be received within a corresponding one of the grooves 20 formed in the coupler members 10, 12.

Figure 4:
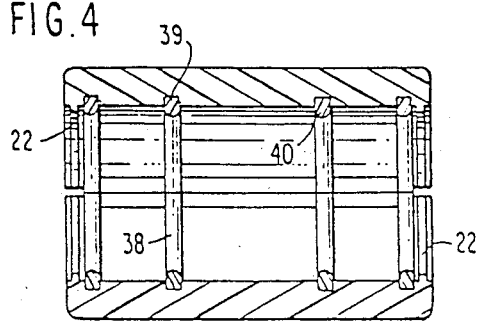
FIG. 4 is a longitudinal sectional view through the assembled coupler.

Each of the grooves 20 is made of substantially square cross-section, and each of the ribs 38 includes a base portion 39 of substantially square cross-section, best shown in FIG. 4, which is received within the corresponding groove 20. In addition to the base portion 39 of square cross-section each rib includes a further portion, best indicated at 40 in FIG. 4, which extends above the top of the corresponding groove and is arranged to engage in sealing relationship the surface of the pipe 31 on which the coupler is assembled. The portion of the rib extending above the groove is preferably arcuate in shape. In the embodiment shown in FIG. 4 the portion 40 is semicircular in cross-section.

In order to insure that the liner 36 is retained within the grooves 20 of the coupler member, the base portion 39 is made of a width slightly exceeding, for example by about 0.002″, the width of the grooves 20. The liner is thus wedged firmly in position in the grooves so as to be maintained in position during assembly of the coupler.

In order to facilitate sealing engagement with the pipe the liners 36 are preferably made of a suitable elastomeric material capable of being compressed under pressure and having adequate resilience and sealing properties. For example, the liner may be formed of a soft polyethylene or neoprene or other soft, compressible, resilient materials. A product sold by E. I. DuPont de Nemours under the designation DuPont 560 EVA is satisfactory.

In order to eliminate the possibility of longitudinal blow-out of the end rib members 41 of the liner and to eliminate the possibility of loss of seal resulting therefrom, each coupler member is formed to include at each end thereof an upstanding ridge 22. This ridge is positioned immediately adjacent to the corresponding end groove 20 in which the end rib 41 of the liner is positioned. The ridge 22 prevents the rib 41 from being blown out longitudinally by pressure in the pipe upon which the coupler is mounted and thereby avoids loss of seal. The ridge 22 on the coupler member is approximately one-half the height of the portion 40 of the liner rib so as to allow for substantial compression of the portion 40 to effect a completely adequate seal before the ridge 22 engages the pipe. The ridge 22 also provides support for the pipe particularly when partially compressed as the coupler is assembled and tightened. This minimizes adverse effects on the seal in case of pressure surges or movement of the pipe. For the latter purpose the ridge 22 is provided with a knife ridge rather than the flat surface illustrated in FIG. 7. The knife edge construction is described in more detail in connection with the embodiment shown in FIGS. 8–16.

The ridge 22, in addition to providing support for the end rib 41 of the liner, as described above, also minimizes exposure of this end rib to sun and other elements and thereby minimizes deterioration thereof.

In order to provide a lateral seal and prevent lateral blow-out, each of the flanges 16, 18 includes adjacent the corresponding end of the semicircular portion of the coupler member a longitudinally-extending recess 44. Each liner includes a longitudinally-extending rib 46 connecting the ends of the semicircular ribs 38 of the liner. Each of the longitudinally-extending ribs 46 is received within the corresponding longitudinally-extending recess 44 in a corresponding flange of a coupler member. As in the case of the semicircular ribs discussed above, each longitudinally-extending rib 46 has a thickness approximately twice the depth of the recess 44 in which it is received so that it extends above the surface of the corresponding flange 16 or 18 by an amount approximately half the thickness of the rib 46. The ribs 46 are compressed when the fasteners are tightened so as to effect firm sealing engagement along the length of the coupler when the coupler members are in assembled relationship. In addition to performing the lateral sealing function, the longitudinally-extending ribs 46, because of their engagement with the recesses 44, assist in properly positioning the liners in the coupler members.

In order to provide a better visual indication that the coupler members have been assembled in satisfactory sealing relationship with the pipe, each of the flanges is provided along its outer edge with a raised longitudinally extending projection 48. Thus, for example, during assembly the fasteners may be tightened until the projections 48 of the two coupler members are brought into engagement throughout their length. In this form of the invention the thickness of the longitudinal rib 46 extending beyond the face of the flange is approximately twice the thickness of the projection 48, so that when the projections 48 are brought into engagement there will have been sufficient compression of the rib 46 to provide an effective seal.

Alternatively, the dimensional relationship between these components may be established so that when the liner ribs have been compressed to a sufficient degree to form an effective seal the projections 48 of the coupler members are still slightly spaced. The fasteners could then be tightened until the space between the projections 48 reaches a predetermined amount. This arrangement also insures that the fasteners, particularly those on the same flange, are tightened to substantially the same degree so as to form an effective seal. Should there be uneven tightening of the fasteners this would be reflected in a variation between the spacing of the projections 48 at one end of the coupler and the spacing of these projections at the other end of the coupler, a difference which can be visually detected. While the projections 48 have been shown as extending the full length of the flanges, shorter projections, for example at the ends of the flanges or spaced along the length thereof, could be employed, if desired.

Figure 5:
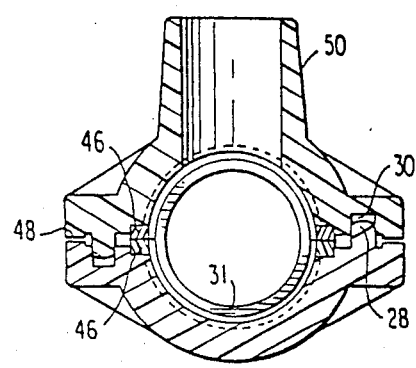
FIG. 5 is a sectional view of a modified form of coupler providing a tee connection.

While the repair coupler of this invention has particular advantages for use in repairing leaks in existing pipes, wherein the leak can be sealed by simply placing the repair coupler of this invention over the area where the leak has occurred and then tightening the coupler into assembled relationship, it can also be used for connecting two longitudinally-extending sections of pipe in a leakproof manner. Further, if desired, one of the coupler members can be made, as shown in FIG. 5, to include an outwardly extending tee 50 by means of which a new pipe can be connected to an existing pipe. Aside from this difference in the construction of one of the mating coupler members the structure shown in FIG. 5 is identical with that described above. Instead of the tee 50 a cross structure could be employed to provide a double connection of two new pipes to an existing pipe.

In one specific embodiment of this invention, where the coupler is employed with pipes of ½" or larger, the following dimensions have been employed. The grooves 20 have a depth of 0.040" to 0.060" and the ribs 38 project above the grooves 20 by approximately 0.020". The longitudinal recesses 44 have a depth of approximately 0.040" and each longitudinal rib 46 of the liner projects above the corresponding recess 44 by about 0.040". The projections 48 have a thickness of about 0.020". The width of the base portion 39 of the liner ribs 38 exceeds the width of the grooves 20 by about 0.002".

Figure 6:
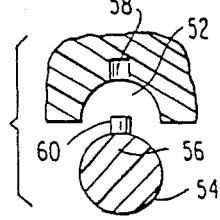
FIG. 6 is an enlarged sectional view of a portion of a modified form of coupler utilizing a groove and liner of modified cross-section.

While the grooves 20 may be of substantially square cross-section and the base portion of the liner ribs may be of corresponding substantially square cross-section, with the thickness of each liner rib 38 slightly exceeding the width of the corresponding groove, as illustrated and described, the grooves and the corresponding portion of the liner ribs can be made in other shapes. A modified form of coupler utilizing grooves of semicircular cross-section in the two coupler members and liners having ribs of circular cross-section is shown in FIG. 6. In this form of the invention the spaced grooves in the coupler members, corresponding to the grooves 20 in the embodiment of FIG. 1, are of semicircular cross-section, as shown at 52. In the embodiment of FIG. 6, the ribs 54 of the liner, corresponding to the ribs 38 in FIG. 1, are of substantially circular cross-section. One half 56 of each rib 54 is received in the corresponding semicircular groove 52.

In order to hold the liners in place on the coupler members during assembly of the coupler, in the embodiment of FIG. 6, a recess 58 is provided in the base of each groove 52, preferably at the midpoint of groove 52. Each of the liner ribs 54 is formed to include a projection 60 which is received in the recess 58 to hold the liner in place during assembly of the coupler. To insure retention of the liner during assembly of the coupler, the projection 60 is made slightly larger in diameter than the recess 58, preferably by about 0.002". While in the embodiment described a single projection 60 and recess 58 are contemplated for each rib, a plurality of spaced projections 60 and recesses 58 could be employed, if desired. Further the projections 60 and recesses 58 hold the ribs against longitudinal shifting under the influence of water pressure during the assembly of the coupler on a pipe.

To repair a leak in an existing pipe with the repair coupler of this invention only a very simple procedure, which can be accomplished in a minimum of time, is required. If the pipe is dirty or rusty the corrosion and soil should be first cleaned with a suitable implement, such as a wire brush. A liner can then be assembled in each of the mating coupler members and these members placed around the pipe in a position surrounding the leak. The aligning pins 28 and recesses 30 assist in assembling the coupler members 10, 12 in proper relationship with respect to each other. However, the aligning pins and receses are not essential and may be omitted as in the embodment illustrated in FIGS. 8-16. The fasteners, each comprising a machine screw 32 and hex-headed nut 34, are then inserted into the holes 26 and tightened simply by means of a screwdriver to bring the coupler members into firm sealing leak-proof engagement with the pipe. The aforementioned projections 48 act as a gauge to enable the user to determine accurately when effective sealing engagement has been accomplished.

In the case of a small crack or pin hole leak in the pipe it is not even necessary to turn the water pressure off before assembling the coupler on the pipe to eliminate the leak. Where a larger break has occurred it may be necessary to turn the water pressure off first and then to assemble the coupler on the pipe. Thereafter the water pressure may be turned on and the coupler will effectively seal against any leakage.

The installation of the repair coupler to seal a leak in an existing pipe is accomplished in several steps. After the coupler members are assembled on the pipe, the machine screws 32 and nuts 34 are tightened to first bring the semicircular ribs 38 into contact with the pipe and the longitudinal ribs 46 into engagement with each other. Thereafter, as the machine screws 32 are further tightened, both the semicircular ribs 38 and the longitudinal ribs 46 are compressed by approximately 0.020". At this time the edges of the ridges 22 come into engagement with the pipe. Further tightening of the several nuts and bolts compresses the ridges 0.004" to 0.006", assisting in providing an effective seal and providing support to minimize relative movement of the coupler and the pipe should the pipe be moved intentionally or by vibration forces. Because of the engagement of the ridges 22 with the pipe any relative movement tending to break the seal is prevented.

Figure 7:
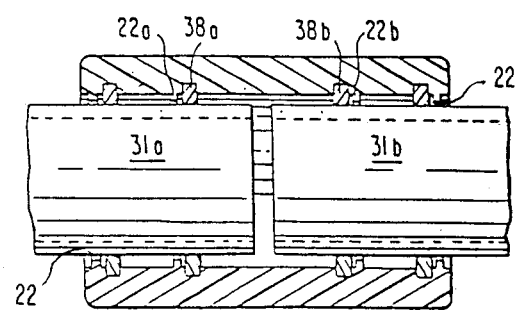
FIG. 7 is a sectional view corresponding to FIG. 4 but showing a modified form of the invention for joining two pipe sections.
Figure 8:
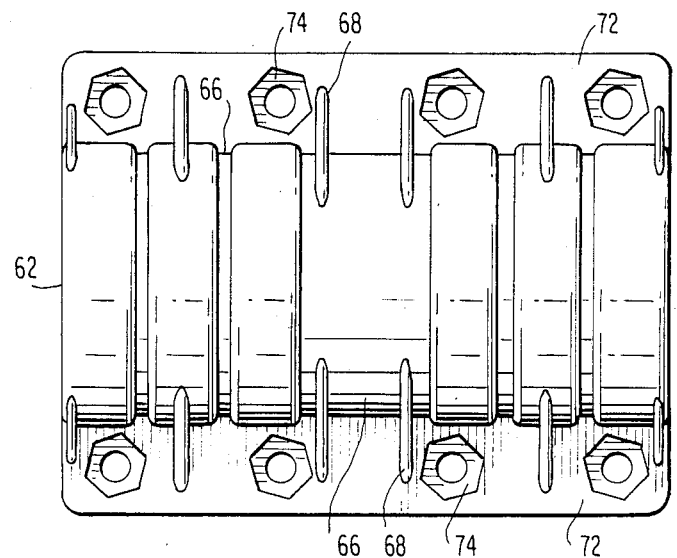
FIG. 8 is a top view of one of the coupler members employed in a modified form of this invention.

While the pipe coupler of this invention is particularly useful for effecting quick and economical repair of leaks in existing pipes, it may also be effectively employed for joining two sections of pipe. As shown in FIG. 7, where the coupler is illustrated joining two pipe sections 31a and 31b, the coupler is made substantially the same as that shown in FIG. 4 except that additional upstanding ridges 22a and 22b, formed like the ridges 22 in FIG. 4, are provided on each coupler member adjacent each of the inner liner ribs 38a and 38b, respectively. These additional upstanding ridges 22a and 22b, like the end ridges 22, provide support for the adjacent liner ribs to prevent dislodgement of the ribs 38a and 38b under pressure exerted by the water in the pipes 31a and 31b. In the embodiment shown the ridges 22a and 22b are approximately 0.020" to 0.040" in height depending on the size of the coupler. While the ridges 22a and 22b may extend, as in the case of ridges 22 in the embodiment of FIG. 1, along the full semicircular extent of the coupler member, all the ridges 22, 22a and 22b may extend only approximately half the semicircular extent. As a further alternative, spaced arcuate sections may be employed in lieu of a single ridge of full or partial semicircular extent. In addition to preventing dislodgment of the adjacent ribs under influence of water pressure the ridges 22a and 22b also assist in supporting the pipe sections 31a and 31b.

The provision of these additional ridges is important when two pipe sections are being joined by the coupler in order to fully support the pipe sections and prevent relative movement of the coupler and pipe sections which could adversely affect the seal.

For more effective pipe support and better protection against loss of seal during pressure surges or pipe movement, the ridges 22 and the ridges 22a and 22b are preferably formed with a knife edge, as described more fully in connection with the embodiment of FIGS. 8-16. The two pipe sections 31a and 31b are normally of the same material. However, the coupler of this invention works satisfactorily even where it is employed to join two pipes of different materials, for example plastic, such as polyvinylchloride, and galvanized iron.

While it is contemplated that the coupler would normally be employed to join two pipe sections of the same size, the coupler can be made to serve also as an adapter, being larger at one end than the other, to join pipes of different sizes. Such a coupler can be employed to join pipes differing in size by as much as ½ inch. It is important, however, that the two ends of such a coupler have the same centerline.

While in the embodiment shown in FIG. 7 the ridges 22a and 22b are shown displaced toward the ends of the coupler relative to the ribs 38a and 38b, respectively, they may alternatively be placed in the opposite side of the ribs 38a and 38b, that is, displaced inwardly relative to these ribs. In many cases, it may be desirable to displace the ridges inwardly when the coupler is used to join two pipe sections, because of the somewhat better pipe support provided when the ridges are so positioned.

A modified form of coupler member, employed in a modified form of this invention is illustrated in FIGS. 8-16. This modified form of the invention is particularly useful when the coupler is employed for joining two sections of pipe. However, this modified form of coupler is also useful as a repair coupler for sealing leaks in existing pipes. It includes features described hereinafter, which make it advantageous to employ this modified coupler both as a repair coupler for leaks in existing pipe and as a coupler for joining sections of pipe.

As in the case of the embodiments previously described, the coupler in this modified form of the invention is made of two identical coupler members, each of them generally semicircular in cross-section so that when assembled they substantially enclose the pipe or pipes with which they are engaged. Each coupler member 62 of the modified form of this invention shown in FIGS. 8-16 is generally similar to the corresponding coupler members 10, 12 in the embodiment previously described, but the coupler member 62 is somewhat longer so that, particularly when used to join pipe sections, a substantial length of coupler is provided in engagement with each pipe section. In the form illustrated the coupler member 62 includes six grooves 64 of semicircular cross-section, three of the grooves being arranged in spaced relationship at one end of the coupler member 62 and the other three being arranged in spaced relationship at the other end thereof. While the embodiment shown in FIGS. 8-16 is illustrated with six spaced semicircular grooves it will be apparent, depending on the use contemplated for the particular coupler, that a greater number or lesser number of such grooves may be employed, although a minimum of two such grooves on each side of the center of the coupler is considered necessary to provide an effective seal.

Figure 11:
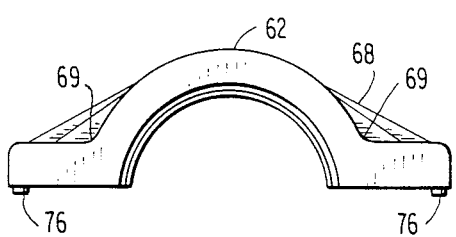
FIG. 11 is an end view of the modified coupler member.

The coupler member 62 differs from the coupler members 10, 12 shown in the first embodiment of this invention in that the exterior semicylindrical surface of thereof instead of being smooth as in the case of coupler member 10, for example, is provided with recessed portions 66. The provision of these recessed portions reduces the amount of material employed, particularly in the central portion of the coupler member, and thereby better controls the shrink factor. Where a greater thickness of material is employed throughout the length of a coupler member of the size shown in this modification, there is a tendency for the coupler member to bow in the middle. When the coupler member is removed from the mold it has not yet become fully hardened in the center or other places where the wall is somewhat thicker and this can result in a bowing and slight distortion of the coupler member. The reduction in the material provided by the recessed portions 66 eliminates this tendency to bow. Gussets 68, corresponding to gussets 24 employed in the modification of FIGS. 1-4, are employed to strengthen the coupler member. Further, as shown in FIG. 11, the coupler member 62 is provided with a fillet or rounded portion 69 in the regions where the semicircular regions thereof merge with the flanges 72. This rounded portion is provided in order to avoid the weakness and possible failure which could occur in these regions when a sharp corner is employed.

The modification in FIGS. 8-16 also differs from that shown in FIGS. 1-4 in that the aligning pin 28 and the corresponding recess 30 are not employed. In lieu thereof a plurality of identical holes 70 are provided in the flanges 72 of each coupler member. It will be apparent, however, that an aligning pin and recess could also be provided, if desired, in the form of the invention shown in FIGS. 8-16. As in the case of the embodiment shown in FIGS. 1-4 this modified form of the invention includes a plurality of hexagonal recesses 74 for receiving and retaining nuts employed with machine screws (not shown) to bring the complementary coupler members into engagement with the pipe to affect a seal. The machine screws employed with the coupler members have diameters such that they have a frictional engagement with the wall of the holes 70 so as to minimize the likelihood that the machine screws will fall out of engagement with the coupler member during assembly of the coupler members on the pipe. In this embodiment, as will be described in more detail later in connection with FIGS. 18-21, additional provision is made for retaining the machine screws and nuts in engagement with the coupler members during assembly. (While machine screws are contemplated for use with the couplers because of ease of assembly and this term is used in the specification and claims, bolts could be employed in lieu of machine screws, and it is intended that the term "machine screws" cover bolts as well as machine screws.)

Figure 9:
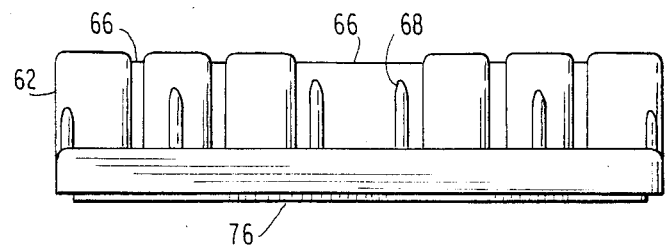
FIG. 9 is a side view of the modified coupler member.
Figure 10:
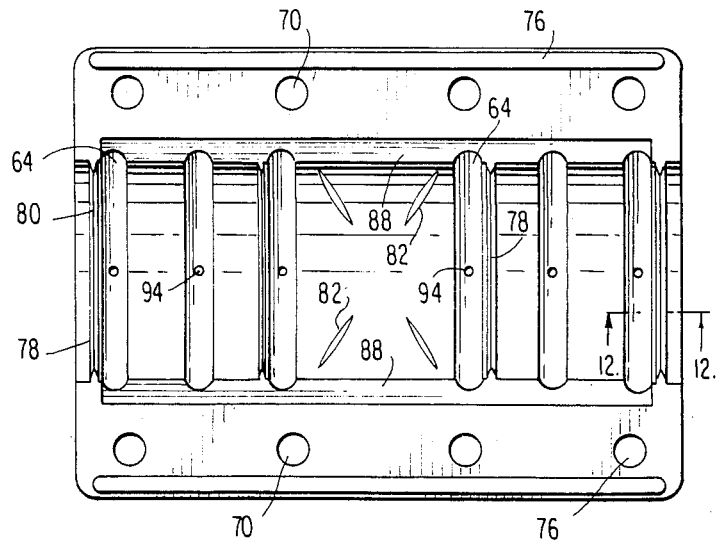
FIG. 10 is a bottom view showing the interior portion of the modified coupler member.

The coupler member 62, as shown in FIGS. 9 and 10, includes gage elements or projections 76 extending longitudinally near the edges of the flanges 62. These gage elements 76 correspond generally to the longitudinal projections 48 employed in the previously-described embodiment. These elements 76 provide several functions. They give extra strength to the coupler member along the longitudinally extending flanges thereof. Secondly, and more importantly, they provide a visual gage enabling the user to easily insure, by visual inspection, that the coupler members are drawn together evenly throughout the length thereof, thereby preventing distortion of the coupler members. Further the thickness of the gage elements 76 is selected relative to the dimensions of the liner so that when the elements 76 are brought into engagement along the length thereof the coupler has been tightened sufficiently to provide an effective seal. Thus, the user has only to tighten the machine screws and nuts sufficiently to bring the elements 76 into engagement in order to be assured that the coupler is making an effective seal.

Figure 17:
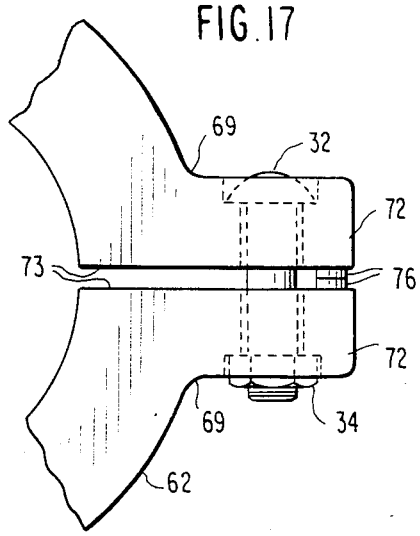
FIG. 17 is an end view of a portion of an assembled coupler showing the flanges thereof.

In any particular size of coupler the thickness of the gage element 76 is chosen relative to the dimensions of the liner so that when the coupler is fully tightened and the complementary gage elements 76 are in engagement with each other along the length thereof, the faces 73 of the flanges 72 are parallel to each other transversely of the coupler, as shown in FIG. 17. This minimizes the stress in the portion 69 of the coupler member, that is the region where the semicircular portion of the coupler member meets the flange, as best shown in FIG. 11.

In the form of invention shown in FIGS. 8-16, a plurality of semicircular ridges are formed on the semicircular interior wall of the coupler member adjacent corresponding grooves 64. Specifically, one such ridge 78 is formed adjacent the outermost groove 64 at each end of the coupler. A second pair of ridges are formed adjacent the innermost grooves 64. In both cases these ridges, as in the case of the ridges 22 in the embodiment shown in FIGS. 1-4, resist longitudinal blowout of the rib of the liner adjacent the corresponding ridge. Further the ridges provide support for the pipes and the outermost ridges minimize the exposure of the outermost rib of the liner to sun, ozone and other elements and thereby minimize the deterioration thereof, as in the case of the ridge 22 previously described.

In the specific embodiment illustrated in FIGS. 8-16, each coupler member includes six grooves 64, three on each side of the center of the coupler member. The ridges 78 are shown as being disposed adjacent only two of the three grooves 64 at each end, specifically adjacent the innermost and the outermost of the three grooves. If additional pipe support is desired or if further protection against blow-out or dislodgement of the intermediate rib of the liner is desired, a further ridge, corresponding to the ridges 78, can be added to the coupler member adjacent the intermediate groove. Such ridge, like those shown in FIG. 10, would be displaced toward the end of the coupler member relative to the intermediate groove with which it is associated.

The ridges 78 employed in the embodiment shown in FIGS. 8-16, however, are specifically constructed of different cross section than that illustrated for ridges 22, 22a and 22b shown in FIG. 7. The ridge cross section employed in this modified form is particularly important when the coupler is utilized for joining two pipe sections, but is advantageous for more effective sealing when the coupler is employed for sealing a leak in an existing pipe. Specifically, the cross section of each ridge is shown in enlarged form in FIG. 12. As there shown the ridges are formed of triangular or tapered cross section so as to provide a knife-edge 80 at the top thereof. When the coupler elements are assembled, as will be described later, the liners are first compressed against the pipe. However, as the tightening of the machine screws and nuts continues the ridges are brought into engagement with the pipe and are actually compressed about 0.004"–0.006" against the pipe itself. This further insures that the coupler will hold the seal as the pipe is moved or in the event of vibration occurs, perhaps from pressure vibrations within the water system itself or from other sources of vibration. Such resistance to shifting of the pipe sections relative to one another and relative to the coupler members is particularly important when the coupler is employed in joining two pipe sections.

To provide further support for the pipe and further insure against undesired relative movement of the components, four diagonally arranged ridges 82 are provided in the central portion of the coupler member 62. Like the ridges 78 the diagonally arranged ridges 82 are of triangular or tapered cross section providing knife edges for engaging the pipe or pipe sections and being slightly compressed, by about 0.004" to 0.006", as the coupler members are brought into assembled position. These knife-edge ridges 82 and the knife-edge ridges 78 are important for gripping and supporting the pipe or pipes with which the coupler is used, so as to minimize relative movement of the pipe or pipes and the coupler components upon the occurrence of pressure surges or other events causing movement of the pipe or pipes. The loss of seal under such conditions is thereby prevented. While the diagonal ridges 82 are advantageous when the coupler is used to seal a leak in an existing pipe, they are particularly advantageous when the coupler is employed to join two pipe sections where the problems discussed above are accentuated.

While no diagonal knife-edge ridges corresponding to ridges 82 have been shown in connection with the embodiments illustrated in FIGS. 1–7, it will be apparent that corresponding ridges could be incorporated in those embodiments with equally beneficial effect.

It will be understood that the ridges 22, 22a and 22b showing in the embodiment illustrated in FIG. 7 may also advantageously be made with knife edges to obtain the additional benefits just discussed in connection with the embodiment of FIGS. 8–16.

Figure 13:
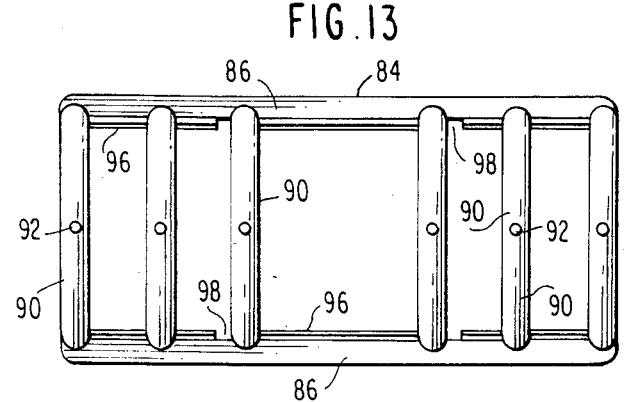
FIG. 13 is a top view of a liner employed with the modified coupler member shown in FIGS. 8–11.
Figure 14:
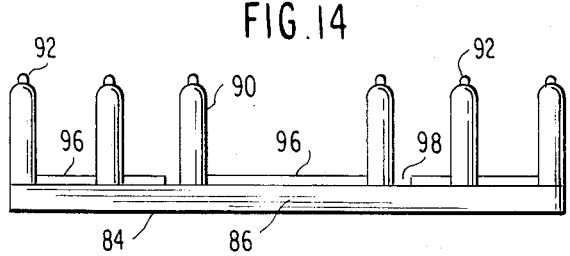
FIG. 14 is a side view of the liner illustrated in FIG. 13.
Figure 15:
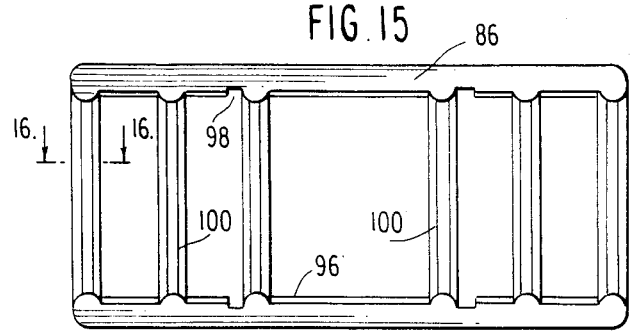
FIG. 15 is a bottom view of the liner, showing compression ridges on the semicircular ribs of the liner.

A liner or gasket 84, shown in FIGS. 13–15, is provided to be received within the interior semicircular wall of each coupler member. As shown in FIGS. 13–15, the liner 84 includes longitudinally extending ribs 86, corresponding to the ribs 46 in the embodiment shown in FIGS. 1–4, which are received, in the assembled position of the liners, in recesses 88, corresponding to the recesses 44 in the embodiment shown in FIGS. 1–4. As in the case of the embodiment earlier described, the ribs 86 are of a thickness approximately twice that of the depth of the recesses 88 and therefore project above the surface of the flanges 72 by approximately half the thickness of these ribs. This enables the longitudinal ribs of the complementary liners received in the complementary coupler members to engage each other in sealing relationship.

The liner 84 further includes a plurality of semicircular ribs 90 extending transversely between the longitudinal ribs 86, these semicircular ribs corresponding to the semicircular ribs 38 in the embodiment previously described. In the specific embodiment shown in FIGS. 13–15, six such ribs are disclosed, but a greater or lesser number may be employed depending on the size of the coupler and the purpose for which it is intended. Each of the semicircular ribs 90 is received in a corresponding groove 64 in the corresponding coupler member 62. The ribs 90 are of circular cross section. Approximately half of each rib is received in a corresponding groove 64 of semicircular cross section in the coupler member 62 and the other half projects above the interior wall of the coupler member for engagement with the pipe in sealing relationship.

In order to retain the liner in engagement with coupler member while the coupler is being assembled on a pipe or pipes, each semicircular rib liner is provided with a projection 92, corresponding to the projection 60 shown in FIG. 6 of an embodiment previously described. The projections 92 are received within recesses 94 (see FIG. 10), corresponding to the recesses 58 in the embodiment of FIG. 6, formed in the bottom central portion of each groove. The projection 92 is of circular cross section and is of a diameter slightly exceeding, by about 0.002 inch, the diameter of the circular recess 94 in which it is received. Thus the projections 92 are slightly squeezed in being forced into the recesses 94, holding the liner in firm engagement with the corresponding coupler member and preventing the liner from becoming disassembled from the coupler member while the coupler is being assembled on the pipe or pipes. While in the specific embodiment illustrated a single projection 92 is provided on each rib 90 and a single recess 94 is provided in each groove, a plurality of projections and recesses spaced along the ribs and grooves may be employed, if desired, for still more effective retention of liner in the coupler member. The engagement of the projections 92 and the recesses 94 also assists in preventing dislodgment of the liner ribs from the grooves 64 under the influence of water pressure while the coupler is being assembled on a pipe.

In addition, the liner is formed to include flanges 96 extending at right angles to the longitudinal ribs 86 at the inner edges of these longitudinal ribs. The flanges 96 extend between adjacent semicircular ribs 90. Thus the flanges 96, in the assembled position of the liner on the coupler member, extend adjacent the interior semicircular wall of the coupler member at the intersection of this wall with the longitudinal recess 88. When the coupler members are assembled on the pipe the flanges 96 come in contact with the pipe and assist in holding the longitudinal ribs 86 in position in the recesses 88, further contributing to a more satisfactory seal. In order to provide space for the inner ridges 78 on the coupler member 62 the flanges 96 do not extend into the spaces 98 adjacent the innermost semicircular rib 90.

Figure 12:
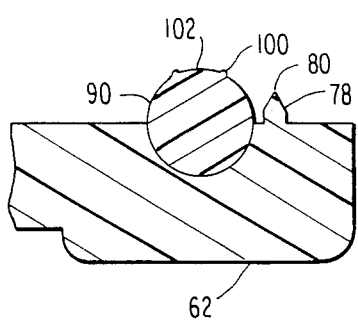
FIG. 12 is an enlarged view of a portion of the coupler member taking along the line 12—12 in FIG. 10.
Figure 16:
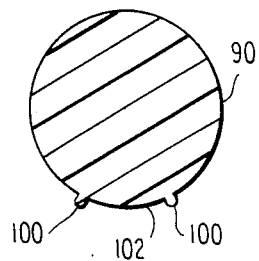
FIG. 16 is a greatly enlarged cross sectional view of one of the ribs of the liner taken along the line 16—16 in FIG. 15, showing the location of the compression ridges.

To further assist in the effectiveness of the coupler as a seal, even at very high pressures, for example, over 200 pounds per square inch, the inner surface of each semicircular rib 90 is formed to include two projections 100, as shown in FIGS. 12, 15 and 16 and in enlarged section in FIG. 16. These projections 100 extend along the full semicircular extent of the rib 90. The projections 100, as best shown in FIG. 16, are symmetrically displaced from the center line 102 of the gasket, and are positioned to as engage the pipe at spaced points when the coupler is assembled and tightened into a sealing engagement with the pipe or pipes. As the liner is compressed during assembly of the coupler, these projections 100 are brought into engagement with the pipe and, during further tightening of the machine screws and nuts, these projections are compressed, causing an increase in density of the liner material at these points and providing a still more effective seal than that which is obtained by making the semicircular ribs 90 of a simple circular cross section. Further, the spaced projections 100, in engaging the pipe and being compressed, resist longitudinal movement of the ribs under influence of water pressure.

While in the embodiment shown in FIGS. 14–16, two spaced projections 100 are employed on the semicircular ribs of the liner, a greater number, for example four, may be employed symmetrically spaced on opposite sides of the central point 102 where even greater sealing is desired. This may be useful where the coupler is being employed to seal against leaks within larger pipes or where extremely high pressure is involved. For example, two spaced projections 100 may be employed on each side of the central point 102. Further sealing is effected by the multiple points of pressure engagement between the projections 100 and the pipe or pipes to be sealed. Further by employing multiple projections on each side of the central point 102 a somewhat labyrinthine type of seal is provided on each side of a leak in a pipe or on each side of the joint between two pipes where the coupler is employed in joining two pipes of any type of material.

It is desirable that the machine screws and nuts, corresponding to the machine screws 32 and nuts 34 in the embodiment shown in FIGS. 1-4, be held in engagement with coupler members during assembly of the coupler on the pipe so that these elements will not fall out of engagement with the coupler member during the assembly process. This is important, since the coupler is expected to be marketed with the required number of machine screws and nuts and the inadvertent loss of one of these elements would be inconvenient to the user. This is particularly important where the coupler may be employed for repair of pipes in soil or under water where these elements can easily be lost. In order to insure retention of the nuts in the recesses 74 these recesses are formed, as shown somewhat exaggerated in the enlarged view of FIG. 18, to be tapered from the top 104 to the bottom 106 of the recess. Thus the distance across a recess at the top thereof slightly exceeds the corresponding dimension of the nut employed, while the distance across a recess at the bottom is slightly smaller than the corresponding dimension of the nut. Because of the material of which the coupler element 62 is formed, as the nut is forced into the recess it cuts into the material of the coupler at the bottom thereof and is thereby retained in position.

Figure 18:
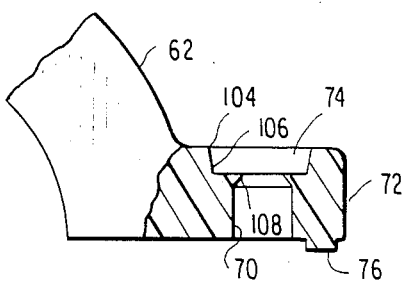
FIG. 18 is a cross sectional view of the flange portion of the liner showing the shape of the recess for receiving the nut and the shape of the passage for receiving the machine screw.

In order to hold the machine screw 32 in position during the assembly process the diameter of the holes 70 is made somewhat smaller at one portion thereof, as shown somewhat exaggerated at 108 in FIG. 18. Thus the diameter of the hole 70 is somewhat larger than that of the machine screw employed therewith, but the diameter in the area 108 is equal to, or preferably slightly less than, that of the machine screw. Therefore, when the machine screw is forced into the hole 70 and past the restricted area 108, it will be held in engagement with the coupler member 62, preventing the machine screw from falling out inadvertently and being lost. While in the illustration in FIG. 18, the portion 108 of reduced size is shown at the end of the hole 70 and adjacent the recess 74, the restriction 108 may be formed anywhere along the length of the hole 70 and still perform its function.

Figure 19:
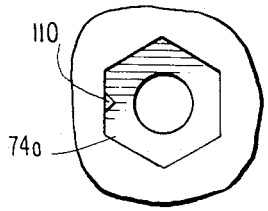
FIGS. 19–21 show three forms of recess for receiving and retaining nuts employed in assembling the coupler.
Figure 20:
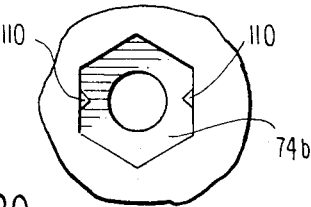
Figure 21:
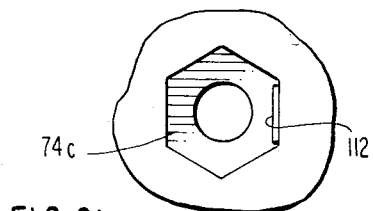

Modified forms of the recess are shown in FIGS. 19, 20 and 21. In FIG. 19 the recess 74a is formed to include on one wall of the hexagonal cross section an inwardly extending tab 110. As the nut 34 is forced into the recess 74a the tab 110 is compressed, retaining the nut firmly in engagement with the walls of the recess.

A modified form of recess 74b is shown in FIG. 20. This recess differs from that in FIG. 19 only in that a second tab 110 is formed on the opposite wall of the recess 74b to provide still further frictional engagement with the nut and a still firmer retention of the nut within the recess.

A further modified form of recessed 74c is shown in FIG. 21. In this recess a tab 112 is formed extending transversely along the full length of one of the walls of the hexagonal recess. This provides a greater surface of contact with the corresponding wall of the hexagonal nut as it forced into the recess, assuring firm retention of the nut in position during assembly of the coupler.

The applicant's improved couplers include features which have enabled the applicant to seal against pressures as high as 500 lbs. per square inch. Further these couplers are of a lightweight and inexpensive construction and can be assembled without the need of any further tools than a screw driver. They can be employed with metal pipes, but they are particularly useful in connection with plastic pipes because, unlike many prior art couplers designed for use with metal, including cast iron, pipes, applicant's couplers are of light weight and can be assembled on a plastic pipe and tightened to seal against very high pressure without causing damage to the plastic pipe. Further, applicant's coupler makes an effective seal against high pressure even with plastic pipes which may be slightly out of round and with metal pipes which may be slightly out of round or which may have an uneven exterior acquired through corrosion. At most, it may be necessary to wire brush some pipes and to wipe them clean of soil before assembling the coupler thereon.

It is claimed:

1. A coupler for sealing leaks in an existing pipe and for connecting first and second pipes in leakproof relationship comprising:
   (a) first and second substantially identical complementary coupler members adapted to be assembled on a pipe;
   (b) each of said coupler members comprising a central semicircular portion and flanges extending laterally from said central portion;
   (c) each of said semicircular portions having a plurality of longitudinally spaced grooves formed therein;
   (d) each of said flanges having a longitudinal recess formed therein adjacent the corresponding edge of said semicircular portion;
   (e) a liner received in each of said members and adapted to engage a pipe in sealing relationship;
   (f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member that, when the coupler elements are in final assembled relationship and said rib is compressed, said ridges engage the pipe for supporting the pipe and minimizing relative movement between the pipe; and (j) each of said flanges including a longitudinally extending projection on the inwardly-facing surface thereof approximately at the outer edge thereof, said fasteners engaging said flanges inwardly of said longitudinally extending projections, said projections providing a gauge for determining when proper sealing pressure has been applied to said coupler.

2. The coupler of claim 1 wherein the thickness of each of said longitudinal ribs of said liner extending above the corresponding flange is approximately twice the thickness of each of said longitudinally extending projections on said flanges whereby when said longitudinally extending projections have been brought into engagement with each other by said fasteners said liners have been sufficiently compressed to provide effective sealing by said coupler.

3. A coupler for sealing leaks in an existing pipe and for connecting first and second pipes in leakproof relationship comprising:

(a) first and second substantially identical complementary coupler members adapted to be assembled on a pipe;

(b) each of said coupler members comprising a central semicircular portion and flanges extending laterally from said central portion;

(c) each of said semicircular portions having a plurality of longitudinally spaced grooves formed therein;

(d) each of said flanges having a longitudinal recess formed therein adjacent the corresponding edge of said semicircular portion;

(e) a liner received in each of said members and adapted to engage a pipe in sealing relationship;

(f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member than, when the coupler elements are in final assembled relationship and said rib is compressed, said ridges engage the pipe for supporting the pipe and minimizing relative movement between the pipe; and (j) each of said flanges including a longitudinally-extending projection on the inwardly-facing surface approximately at the outer edge thereof, said fasteners engaging said flanges inwardly of said longitudinally extending projections, the space between said projections during tightening of said fasteners providing a visual indication of even tightening of said fasteners along the length of said coupler, whereby distortion of said coupler members during assembly on a pipe is avoided.

4. A coupler for sealing leaks in an existing pipe and for connecting first and second pipes in leakproof relationship comprising:

(a) first and second substantially identical complementary coupler members adapted to be assembled on a pipe;

(b) each of said coupler members comprising a central semicircular portion and flanges extending laterally from said central portion;

(c) each of said semicircular portions having a plurality of longitudinally spaced grooves formed therein;

(d) each of said flanges having a longitudinal recess formed therein adjacent the corresponding edge of said semicircular portion;

(e) a liner received in each of said members and adapted to engage a pipe in sealing relationship;

(f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member that, when the coupler elements are in final assembled relationship and said rib is compressed, said ridges engage the pipe for supporting the pipe and minimizing relative movement between the pipe; and (j) each of said flanges including a longitudinally-extending projection or the inwardly-facing surface approximately at the outer edge thereof, said fasteners engaging said flanges inwardly of said longitudinally extending projections, the thickness of each of said projections and the dimensions of said liner being selected so that when said projections have been brought into engagement along the length thereof the coupler has been tightened sufficiently to provide as effective seal.

5. A coupler for sealing leaks in an existing pipe and for connecting first and second pipes in leakproof relationship comprising:

(a) first and second substantially identical complementary coupler members adapted to be assembled on a pipe;

(b) each of said coupler members comprising a central semicircular portion and flanges extending laterally from said central portion;

(c) each of said semicircular portions having a plurality of longitudinally spaced grooves formed therein;

(d) each of said flanges having a longitudinal recess formed therein adjacent the corresponding edge of said semicircular portion;

(e) a liner received in each of said members and adapted to engage a pipe in sealing relationship;

(f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member that, when the coupler elements are in final assembled relationship and said rib is compressed, said ridges engage the pipe for supporting the pipe and minimizing relative movement between the pipe; and (j) each of said semicircular ribs of said liner including along the length of the inner face thereof two projections equally spaced from the centerline of said rib on opposite sides of the centerline, said projections extending the length of said semicircular rib and engaging the pipe in the assembled position of said coupler, said projections being compressed during assembly of the coupler to provide compression seals.

6. A coupler for sealing leaks in an existing pipe and for connecting first and second pipes in leakproof relationship comprising:

(a) first and second substantially identical complementary coupler members adapted to be assembled on a pipe;

(b) each of said coupler members comprising a central semicircular portion and flanges extending laterally from said central portion;

(c) each of said semicircular portions having a plurality of longitudinally spaced grooves formed therein;

(d) each of said flanges having a longitudinal recess formed therein adjacent the corresponding edge of said semicircular portion;

(e) a liner received in each of said members and adapted to engage a pipe in sealing relationship;

(f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member that, when the coupler elements are in final assembled relationship and said rib is compressed, said ridges engage the pipe for supporting the pipe and minimizing relative movement between the pipe; and (j) each of said longitudinal ribs including a depending flange at the inner edge thereof, said flange being received between the pipe and the semicircular portion of the corresponding coupler member to assist in keeping each of said longitudinal ribs in the corresponding longitudinal recess.

7. A coupler for sealing leaks in an existing pipe and for connecting first and second pipes in leakproof relationship comprising:

(a) first and second substantially identical complementary coupler members adapted to be assembled on a pipe;

(b) each of said coupler members comprising a central semicircular portion and flanges extending laterally from said central portion;

(c) each of said semicircular portions having a plurality of longitudinally spaced grooves formed therein;

(d) each of said flanges having a longitudinal recess formed therein adjacent the corresponding edge of said semicircular portion;

(e) a liner received in each of said members and adapted to engage a pipe in sealing relationship;

(f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member that, when the coupler elements are in final assembled relationship and said rib is compressed, said ridges engage the pipe for supporting the pipe and minimizing relative movement between the pipe; and (j) each of said fasteners comprising a machine screw and a nut, said coupler members including a plurality of holes through said flanges for receiving said machine screws through aligned holes in said complementary coupler members and further including recesses for receiving said nuts, said recesses being formed to provide means for retaining said nuts therein during assembly of said coupler; and (k) said means for retaining said nuts comprising forming each of said recesses to provide walls tapering toward the bottom thereof, the transverse dimension of said recess at the top thereof exceeding the corresponding dimension of the nut received therein, the transverse dimension of said recess at the bottom thereof being slightly less than the corresponding dimension of the nut received therein, whereby when the nut is pressed into the recess it cuts into the material of the coupler member at the bottom of said recess to retain the nut in said recess.

8. A coupler for sealing leaks in an existing pipe and for connecting first and second pipes in leakproof relationship comprising:

(a) first and second substantially identical complementary coupler members adapted to be assembled on a pipe;

(b) each of said coupler members comprising a central semicircular portion and flanges extending laterally from said central portion;

(c) each of said semicircular portions having a plurality of longitudinally spaced grooves formed therein;

(d) each of said flanges having a longitudinal recess formed therein adjacent the corresponding edge of said semicircular portion;

(e) a liner received in each of said members and adapted to engage a pipe in sealing relationship;

(f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member that, when the coupler elements are in final assembled relationship and said rib is compressed, said ridges engage the pipe for supporting the pipe and minimizing relative movement between the pipe;

(j) each of said fasteners comprising a machine screw and a nut, said coupler members including a plurality of holes through said flanges for receiving said machine screws through aligned holes in said complementary coupler members and further including recesses for receiving said nuts, said recesses being formed to provide means for retaining said nuts therein during assembly of said coupler; and (k) said means for retaining said nuts comprising a tab projecting inwardly from a wall of each of said recesses to engage the corresponding nut and retain said nut in the recess during assembly of the coupler on a pipe.

9. The coupler of claim 8 wherein each of said recesses is hexagonal in shape, each of said nuts is hexagonal, and said tab projects inwardly from one wall of said recess to engage a corresponding side of said nut.

10. The coupler of claim 9 wherein said means for retaining said nuts includes a second tab extending inwardly from a wall of said recess opposite said one wall.

11. The coupler of claim 8 wherein said tab extends transversely along said wall of said recess and extends substantially the full width of said wall.

12. A coupler for sealing leaks in an existing pipe and for connecting first and second pipes in leakproof relationship comprising:

(a) first and second substantially identical complementary coupler members adapted to be assembled on a pipe;

(b) each of said coupler members comprising a central semicircular portion and flanges extending laterally from said central portion;

(c) each of said semicircular portions having a plurality of longitudinally spaced grooves formed therein;

(d) each of said flanges having a longitudinal recess formed therein adjacent the corresponding edge of said semicircular portion;

(e) a liner received in each of said members and adapted to engage a pipe in sealing relationship;

(f) each of said liners comprising a plurality of semicircular ribs, each of said ribs being received in a corresponding one of said grooves;

(g) each of said liners further including longitudinal ribs connecting the ends of said semicircular ribs, each of said longitudinal ribs being received in a corresponding one of said longitudinal recesses;

(h) fasteners engaging said flanges for causing said liners to be urged against the pipe in sealing relationship;

(i) said semicircular portion of said coupler member including first ridges extending above the surface of said semicircular portion, each of said first ridges being disposed adjacent the corresponding one of said grooves nearest the end of said coupler member and being displaced toward the corresponding end of said coupler member relative to said groove, each of said first ridges supporting the adjacent rib of said liner against longitudinal pressure blow-out, each of said first ridges being of such height relative to the thickness of the rib extending above the surface of said semicircular portion of said coupler member that, when the coupler elements are in final assembled relationship and said rib is compressed, said ridges engage the pipe for supporting the pipe and minimizing relative movement between the pipe;

(j) each of said fasteners comprising a machine screw and a nut, said coupler members including a plurality of holes through said flanges for receiving said machine screws through aligned holes in said complementary coupler members and further including recesses for receiving said nuts, said recesses being formed to provide means for retaining said nuts therein during assembly of said coupler; and (k) each of said holes including a portion of reduced diameter for engaging the corresponding machine screw to retain said machine screw in said hole during assembly of said coupler, the diameter of said reduced portion being slightly smaller than the diameter of said machine screw.

* * * * *